United States Patent
Burböck et al.

(10) Patent No.: US 11,582,893 B2
(45) Date of Patent: Feb. 21, 2023

(54) SHARE FOR A SOIL CULTIVATION IMPLEMENT

(71) Applicant: BOEHLERIT GmbH & Co. KG., Kapfenberg (AT)

(72) Inventors: Hannes Burböck, Kindberg/Aumühl (AT); Walter Bärnthaler, St. Marein im Mürztal (AT)

(73) Assignee: BOEHLERIT GMBH & CO. KG., Kapfenberg (AT)

( * ) Notice: Subject to any disclaimer, the term of this patent is extended or adjusted under 35 U.S.C. 154(b) by 37 days.

(21) Appl. No.: 16/871,650

(22) Filed: May 11, 2020

(65) Prior Publication Data
US 2021/0000003 A1    Jan. 7, 2021

(30) Foreign Application Priority Data
Jul. 2, 2019   (AT) .............................. A 50602/2019

(51) Int. Cl.
*A01B 15/04*     (2006.01)

(52) U.S. Cl.
CPC .................................. *A01B 15/04* (2013.01)

(58) Field of Classification Search
CPC ....... A01B 15/02; A01B 15/025; A01B 15/04; A01B 15/06; A01B 23/02
See application file for complete search history.

(56) References Cited

U.S. PATENT DOCUMENTS

| 989,729 | A | * | 4/1911 | Swindle | A01B 35/225 |
|---|---|---|---|---|---|
|  |  |  |  |  | 172/750 |
| 1,769,545 | A |  | 7/1930 | Pence |  |
| 2,328,449 | A |  | 8/1943 | Haberstump |  |
| 2,796,012 | A | * | 6/1957 | Botha | A01B 13/08 |
|  |  |  |  |  | 172/699 |
| 3,085,635 | A | * | 4/1963 | Livermore | A01B 15/025 |
|  |  |  |  |  | 172/699 |
| 3,752,236 | A | * | 8/1973 | Foster | A01B 15/025 |
|  |  |  |  |  | 172/753 |
| 4,269,274 | A | * | 5/1981 | Robertson | E02F 9/2808 |
|  |  |  |  |  | 172/699 |
| 4,625,810 | A | * | 12/1986 | Edmisson | A01B 23/02 |
|  |  |  |  |  | 172/747 |
| 4,754,816 | A | * | 7/1988 | Edmission | A01B 23/02 |
|  |  |  |  |  | 172/747 |

(Continued)

FOREIGN PATENT DOCUMENTS

DE         8332105       3/1984
DE     10 2014 115209    4/2016

(Continued)

OTHER PUBLICATIONS

Europe Search Report/Office Action conducted in counterpart Europe Appln. No. EP 20169184 (dated Oct. 15, 2020).

(Continued)

*Primary Examiner* — Jessica H Lutz
(74) *Attorney, Agent, or Firm* — Greenblum & Bernstein, P.L.C.

(57) ABSTRACT

A share for a soil cultivation implement for cultivating soil. The share is bent and has at least one mounting hole for receiving a fastener, and the share is tipped on an upper side with at least one carbide insert. A bend of the share has a plurality of different bending radii.

12 Claims, 4 Drawing Sheets

(56) References Cited

U.S. PATENT DOCUMENTS

| | | | | |
|---|---|---|---|---|
| 4,867,248 | A * | 9/1989 | Robertson | A01B 15/025 |
| | | | | 403/255 |
| 5,375,350 | A * | 12/1994 | Maybon | B22F 7/08 |
| | | | | 37/195 |
| 5,502,905 | A * | 4/1996 | Cornelius | E02F 9/285 |
| | | | | 37/454 |
| 6,607,040 | B2 * | 8/2003 | Skjaeveland | A01B 15/06 |
| | | | | 172/749 |
| 8,875,424 | B2 * | 11/2014 | Moller | E02F 9/2808 |
| | | | | 37/452 |
| 10,184,226 | B2 * | 1/2019 | Parzynski, Jr. | E02F 3/8152 |
| 2006/0143953 | A1 | 7/2006 | Karlsson et al. | |
| 2009/0308296 | A1 * | 12/2009 | Senchuk | A01C 5/062 |
| | | | | 111/8 |
| 2010/0170687 | A1 * | 7/2010 | Arnabat Castellvi | A01B 15/04 |
| | | | | 172/681 |
| 2013/0240225 | A1 * | 9/2013 | Widmaier | A01B 35/26 |
| | | | | 172/762 |
| 2015/0319915 | A1 * | 11/2015 | Pfitzner | A01C 5/062 |
| | | | | 111/163 |
| 2016/0326727 | A1 * | 11/2016 | Skjaeveland | A01B 23/02 |
| 2017/0223887 | A1 * | 8/2017 | Scherf | A01B 15/04 |
| 2017/0325392 | A1 * | 11/2017 | Essig | A01B 23/02 |
| 2017/0367248 | A1 * | 12/2017 | Essig | A01B 15/02 |
| 2018/0235137 | A1 * | 8/2018 | Seifried | A01B 33/08 |
| 2018/0368305 | A1 * | 12/2018 | Sanderson | F16B 2/14 |
| 2019/0045698 | A1 * | 2/2019 | Weast | A01B 15/02 |
| 2019/0276999 | A1 * | 9/2019 | Holman | E01H 5/062 |
| 2021/0185872 | A1 * | 6/2021 | Barnthaler | A01B 35/26 |

FOREIGN PATENT DOCUMENTS

| | | |
|---|---|---|
| DE | 10 2015 122 620 | 6/2016 |
| EP | 1 590 534 | 11/2005 |
| EP | 2 591 648 | 5/2013 |
| EP | 2 996 954 | 3/2017 |
| EP | 3 172 951 | 5/2017 |
| EP | 3 235 358 | 10/2017 |
| GB | 642 268 | 2/1948 |
| RU | 2648713 | 3/2018 |
| WO | 2004/057117 | 7/2004 |
| WO | 2014/101907 | 7/2014 |

OTHER PUBLICATIONS

Austria Search Report conducted in counterpart Austria Appln. No. A 50602/2019 (dated Nov. 15, 2019).
Opposition filed in counterpart Austria Appln. No. A 50602/2019 (Austria Patent No. 522 699) (dated May 25, 2021).
Argument Letter from Opposer Submitted to Austria Patent Office in Support of Opposition.
Technische Zeichnung BAT 100 (Doc. B in Argument Submitted in Support of Opposition) (created Jul. 26, 2012, edited Oct. 7, 2014).
Rechnung BAT 100 (Doc. C in Argument Submitted in Support of Opposition) (Jul. 3, 2017).
Lieferschein BAT 100 (Doc. D in Argument Submitted in Support of Opposition) (Jul. 3, 2017).
Auszug Internet Betek "Agrartechnik" https://www.betek.de/produkte/agrartechnik/produktuebersicht.html (Doc. E in Argument Submitted in Support of Opposition) (no date provided).
Technische Zeichnung BAT 116 (Doc. F in Argument Submitted in Support of Opposition) (created Mar. 19, 2013, edited Mar. 18, 2013).
Rechnung BAT 116 (Doc. G in Argument Submitted in Support of Opposition) (Jul. 11, 2017).
Lieferschein BAT 116 (Doc. H in Argument Submitted in Support of Opposition) (Jul. 11, 2017).

* cited by examiner

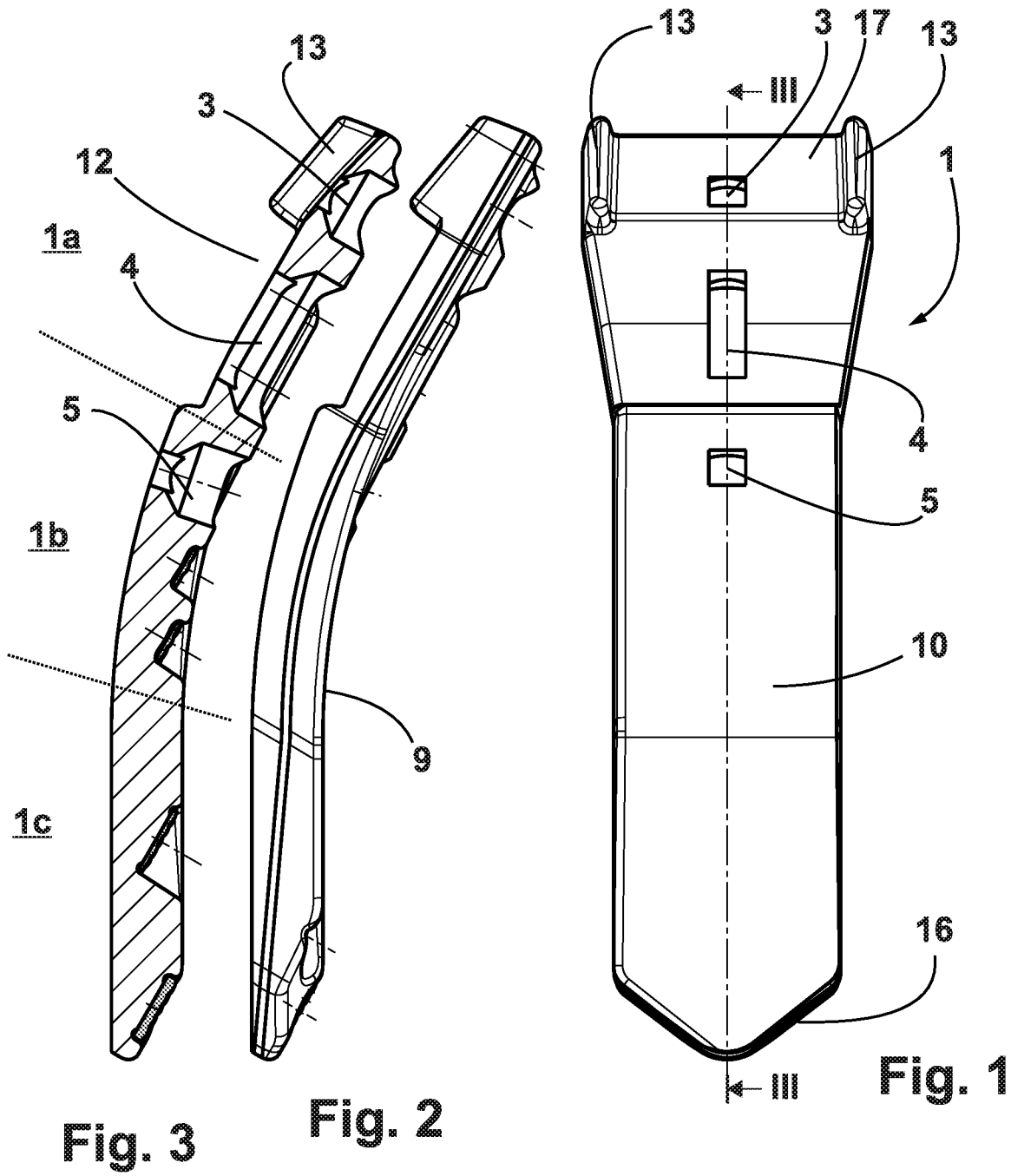

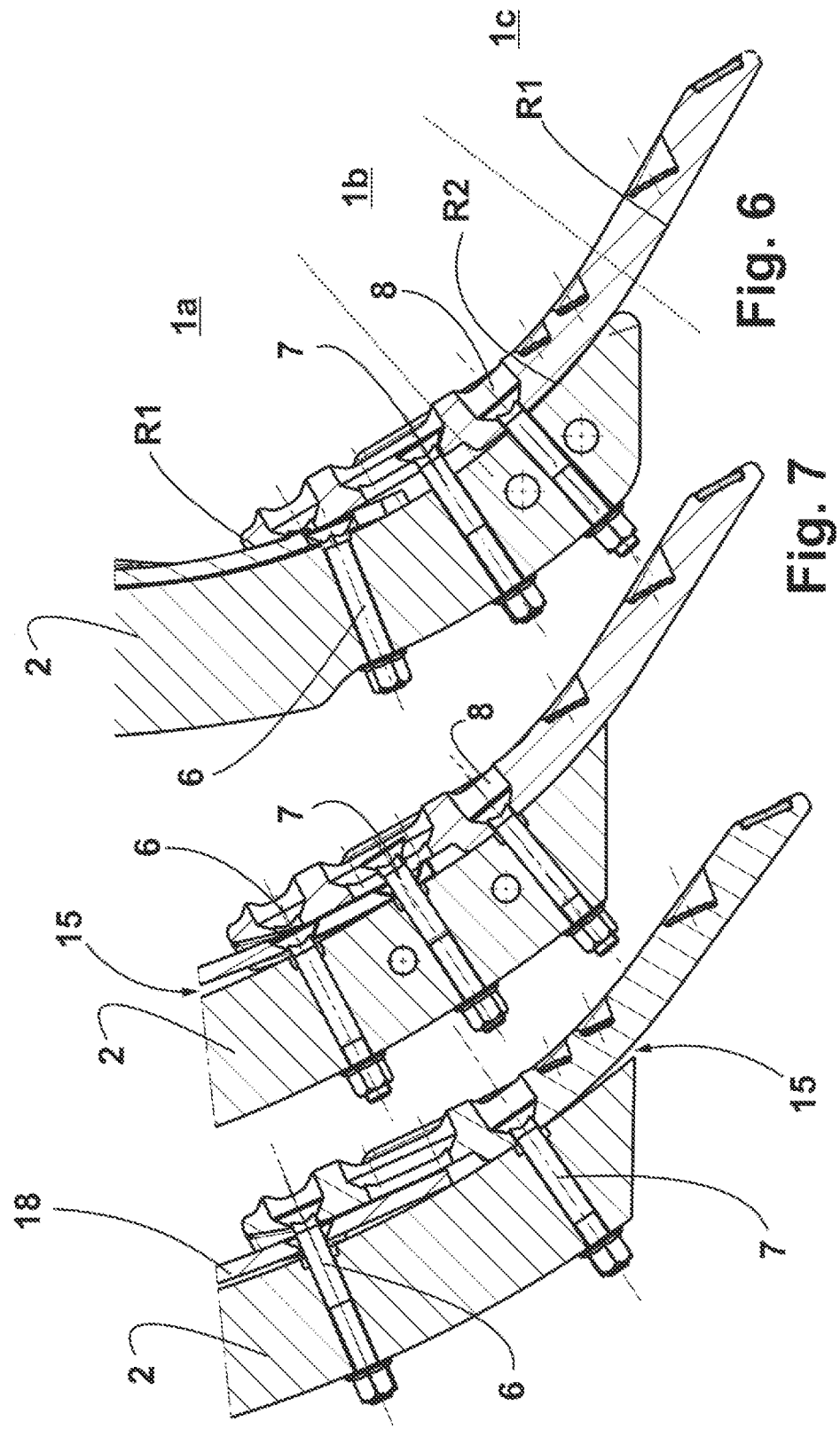

SHARE FOR A SOIL CULTIVATION IMPLEMENT

CROSS-REFERENCE TO RELATED APPLICATIONS

The present application claims priority under 35 U.S.C. § 119(a) of Austria Patent Application No. A 50602/2019 filed Jul. 2, 2019, the disclosure of which is expressly incorporated by reference herein in its entirety.

BACKGROUND

1. Field of the Invention

The invention relates to a share for a soil cultivation implement for cultivating soil, wherein the share is bent and has at least one mounting hole for receiving a fastener, and wherein the share is tipped on an upper side with at least one carbide insert.

2. Discussion of Background Information

In agriculture, effective soil cultivation is required prior to sowing in order to subsequently achieve a good harvest result. For the preparation of agriculturally used soil, various soil cultivation implements are known which are usually mounted directly or indirectly on a tractor and are moved by the same such that they penetrate into the soil. These include, for example, cultivator shares and components connected thereto with which soil can be loosened or lifted.

For many decades, cultivator shares and other individual parts for agricultural soil cultivation or corresponding implements were made exclusively of steel. On the one hand, steel is relatively inexpensive and, on the other hand, it is basically also quite wear-resistant. In recent times, however, it has become common practice to additionally tip steel components with carbide inserts. Although carbide is many times more expensive than steel, it has been found that by using appropriate carbide tipping, the service life of cultivator shares, for example, can be extended to such an extent that in an overall assessment, the initially higher manufacturing costs in relation to the maximum service life are amortized and overall, a better cost-benefit ratio is provided.

Cultivator shares, and often also other individual parts, are attached to receiving components, which in turn are connected to a towing vehicle, such as a tractor. It is common for cultivator shares to be attached to a tine, which has a curved shape. This tine, which is usually made of steel, is also subject to a certain amount of wear when it comes into direct contact with soil that is lifted and slides along the shares and then along the tine. Therefore, a guide plate is often provided which serves for a better mixing of the soil. This guide plate is attached to the tine together with the cultivator share by placing the guide plate on the tine and thereafter placing the cultivator share on top and fastening them to the tine using a fastener so that the guide plate is held clamped between the cultivator share and the tine. To make this possible, both the cultivator share and the guide plate have at least one mounting hole through which a fastener can be passed. When cultivating the soil, the cultivator share is then actively cultivating, whereas the tine only serves as a support for the cultivator share and the clamped guide plate serves as protection for the tine.

The tines known from prior art have different bends, depending on the manufacturer. Well known are tines with a radius of 300 mm, but also tines with a radius of 600 mm. Tines with smaller or larger radii or a plurality of radii are also known. The problem here is that up to now, for each design of a tine, a correspondingly adapted share or cultivator share has to be provided, which is in each case adapted to the bending radius of the tine. What this means for a farmer is that for the replacement of worn shares, many different share models have to be kept in stock, which requires a high stock level.

SUMMARY

It is an object of the invention to provide a share of the aforementioned type which is compatible with a multiplicity of base bodies, such as tines, so that they can be used as universally as possible, regardless of a base body.

This object is achieved when in case of a share of the aforementioned type, a bend of the share has a plurality of different bending radii.

The invention is based on the consideration that when designing a share, such as a cultivator share, having different bending radii, areas are created for engagement on a base body, such as tine, which result in a full-surface engagement on the base body, while accepting that in other areas with a different bending radius, full-surface engagement is not achieved and that sometimes there may be a gap or play. However, the partial full-surface engagement is completely sufficient for a functional purpose. On the other hand, the areas that do not perfectly engage on each other, which are designed with a different bending radius, allow a reversed situation to occur with another base body having different bends, so that then the areas that do not engage over the full surface become in this case the areas that engage over the full surface and there is a gap or play in other areas. In other words, it can also be said that by designing the shares with different bending radii for individual base bodies for soil cultivation, sufficient engagement areas are created, wherein different engagement areas are used for different base bodies. This can therefore be deemed a universal share that fits on different base body models. This simplifies stock-keeping in the long term. In this connection it is also surprising that it is not necessary at all that a share, such as a cultivator share, engages on the base body in all areas or at least to a large extent or predominantly over the full surface, but that partial areas are already sufficient for the functional purpose.

Preferably, a first bending radius and a second bending radius are provided. The two bending radii have different radii. Although basically any number of bending radii can be provided, a maximum of three to four bending radii is practical. With more bending radii, even more base bodies can be fitted; however, on the one hand, the number of base bodies is manageable and, on the other hand, more bending radii reduce the maximum surface on which a maximum full-surface engagement is possible in the individual case of a certain base body. In this context it is particularly preferred that a plurality of share sections is bent with the first bending radius or the second bending radius. Here, it can also be provided that a sequence of first bending radius, second bending radius and then again first bending radius is provided along the shares. Thus, two areas or share sections having the first bending radius are provided, between which an area having the second bending radius is arranged. Therefore, in case of a base body that has a corresponding first bending radius, the shares can come into engagement at the beginning and at the end, which is completely sufficient for the functional purpose. However, in case of a base body having the second bending radius, the area of the share having the second bending radius comes into full-surface engagement. This, in turn, is also sufficient for a perfect function during operation. The individual surfaces can be designed in such a manner that, in terms of the surface area, the two sections having the first bending radius correspond approximately to the surface having the second bending radius, so that overall, regardless of the base body, approximately the same surface is provided for each bending radius. In principle, however, this ratio of the surfaces can also be designed to be variable and, for example, can be in the range of 0.5:1.5 in relation to the surfaces with the first bending radius and the surfaces with the second bending radius.

It is preferred that a recess for receiving a guide plate is provided on a lower side of the share. By means of a corresponding recess, flexibility is achieved with regard to a possible reception of a guide plate. If there is no guide plate, the receptacle can remain free. Otherwise, the guide plate can be placed underneath the share and above a tine.

The (universal) share according to the invention can thus be used with or without a guide plate. According to the prior art, the guide plates are mostly shaped such that they engage in a positive-locking manner in a corresponding recess on the underside of a share. After fixing the guide plate and the share to a base body by means of a fastener, anti-twist protection is achieved by a corresponding positive fit. In contrast, the recess of a share according to the invention does not end v-shaped in plan view, as for example in the prior art, but ends straight, in particular to be able to also receive guide plates of different shapes. In order to still achieve anti-twist protection, the share has lugs protruding from the lower side. These lugs engage around corresponding outer sides of a base body so that even under the forces acting during operation, the share cannot be swiveled around the axis of the fastener(s), which would cause the share to loosen over time. Thus, despite the flexibility to receive different guide plates with different geometric shapes, protection against unintentional swiveling during operation and a resulting loosening of the fastening is still achieved.

In order to make the shares even more robust against wear during operation, reinforcements can be provided on an upper side of the share.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

Further features, advantages and effects of the invention are apparent from the exemplary embodiments shown below. In the drawings, to which reference is made:

FIG. 1 shows a share viewed from below;

FIG. 2 shows a side view of the share according to FIG. 1;

FIG. 3 shows a section along line III-III in FIG. 1;

FIG. 4 shows a rear view of a share according to FIG. 1;

FIG. 6 shows a cross-sectional view on a share fastened to a first soil cultivation implement;

FIG. 7 shows the share of FIG. 6 fastened on another soil cultivation implement in cross-section;

FIG. 8 shows the share of FIG. 6 fastened on a further soil cultivation implement in cross-section;

DETAILED DESCRIPTION

Figure 5:
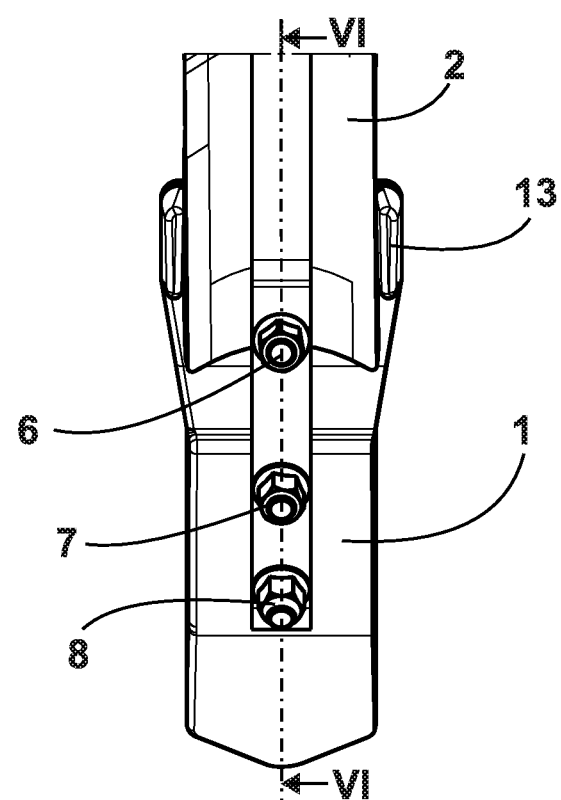
FIG. 5 shows a view of a share fastened to a base body as seen from below.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In FIG. 1 to FIG. 4, a share 1 according to the invention is illustrated in different views or cross-sections, namely in a view from below according to FIG. 1, a side view according to FIG. 2 as well as a rear view according to FIG. 4 and in a cross-section according to FIG. 3, which corresponds to a section along line III-III in FIG. 1.

As can be seen in FIG. 1 to FIG. 4, share 1 has a bent shape and extends longitudinally from a first end 16 to a second end 17. At the first end 16, the share 1 has a tapered form, which together with the bent design is useful or necessary for cutting into soil. Starting from the first end 16, the share 1 first extends with a constant width before the shape of the share 1 first widens conically towards the second end 17 and then transitions again into a region with a constant cross-section, as can be seen in particular in FIG. 1 and FIG. 4.

Along its longitudinal extent, the share 1 has an upper side 9 which delimits the share 1 towards the top, and on the opposite side, it has a correspondingly delimiting lower side 10. Upper side 9 and lower side 10 are connected by side faces. Furthermore, the share 1 has a first mounting hole 3, a second mounting hole 4, which is formed as an elongated hole, and a third mounting hole 5. These mounting holes 3, 4, 5 extend through the share 1 from the upper side 9 to the underside 10 and functionally serve to receive a fastener when the share 1 is fastened to a soil cultivation implement 2. Furthermore, for this purpose, the share 1 has lugs 13 which interact with the soil cultivation implement 2 in a manner to be explained later. The lugs 13 are formed at the second end 17 on the lower side 10 and preferably extend vertically away from it.

As can be seen in particular in FIG. 2 and FIG. 3, the share 1 also has a recess 12 which extends away from the second end 17 or is integrated therein. As illustrated, the recess 12 can extend, for example, along the intermediate section, which then tapers conically when viewed from a different viewing direction, namely from the second end 17, up to the section of the share 1 having a constant cross-section (with the exception of the adjoining first end 16). At an ending which is situated opposite to a beginning of the recess 12 in the area of the second end 17, the recess 12 ends straight.

As mentioned, the share 1 has a bent shape. According to invention, the share 1 has different bending radii R1, R2. The bending radii R1, R2 are provided in different share sections 1a, 1b, 1c. In the exemplary embodiment according to FIG. 1, a first bending radius R1 is provided in the share sections 1a, 1c. Between these two share sections 1a, 1c, which begin in the region of the first end 16 and in the region of the second end 17, respectively, there is a further share section 1b, which is formed with a second bending radius R2. The bending radius R1 can be 300 mm, for example, whereas the bending radius R2 is twice as large and is 600 mm. The share 1 thus has engagement areas with different bending radii R1, R2 in share sections 1a, 1b, 1c for fastening to a soil cultivation implement 2.

In FIG. 5, the share 1 according to FIG. 1 to FIG. 4 is shown again, but fastened to a tine of a soil cultivation implement 2. As can be seen, the share 1 is fastened to the tine with three fasteners 6, 7, 8. The fasteners 6, 7, 8 each comprise a bolt as well as a corresponding nut by means of which fixing to the tine or soil cultivation implement 2 by engaging in the mounting holes 3, 4, 5 is possible. The lugs 13, which are attached to the lower side 10 at the second end 17 and preferably extend vertically downwards, engage positively around the tine of the soil cultivation implement 2, so that even without a positive fit by means of a guide plate on the lower side 10, protection against twisting of the share 1 is provided during operation and position stability is further increased by the three fasteners 6, 7, 8. Even if only one of the fasteners 6, 7, 8 is provided, swiveling of the share 1 under very high force is avoided, so that the detachable connection with one of the fasteners 6, 7, 8 cannot loosen sequentially during operation to the extent that the share 1 detaches from the tine.

In FIG. 6 to FIG. 8, the concept of the different bending radii R1, R2 or the universal applicability of a share 1 according to the invention is shown in cross sections as an example. In each case, a single, unmodified share 1 according to the invention is shown, which, however, is fastened to different base bodies, such as a tine of a soil cultivation implement 2. In the first situation according to FIG. 6, the bent tine has a continuous radius of 300 mm. Thus, in the share sections 1a, 1c, the share 1 comes into engagement with the first bending radius R1 over its full surface and with the same radius. A guide plate 18 can also be received under full-surface engagement of share 1 in the area of the second end 17 via the previously explained recess 12. In comparison with the prior art, the recess 12 does not have a v-shaped or differently shaped structure for positively receiving a corresponding end of guide plate 18, but, as explained, is formed such that it ends straight; however, anti-twist protection is achieved by the lugs 13 in the manner already described. In the middle share section 1b, the share 1 has a bending radius R2, which is 600 mm. In this area, full-surface engagement of the shares 1 on the tine is therefore not possible, but a gap 15 is provided. However, since there is full-surface engagement in the share sections 1a, 1c, sufficient fixing of the share 1 on the tine 2 is already also provided for the intended applications.

In FIG. 7, the tine or the soil cultivation implement 2 is formed with a varying radius of 300 mm at the end and then 600 mm towards the guide plate 18. In this case, the share 1 is in full-surface engagement on the tine in the share sections 1b, 1c. In this case, however, in the area of the second end 17 of share 1 as well as the guide plate 18, a gap 15 occurs at the end of the share 1 because in this case, the radii of the share 1 and the tine are formed differently, namely the tine with 600 mm and the share 1 with 300 mm.

FIG. 8 illustrates a further situation in which the tine or the soil cultivation implement 2 is continuously formed with a radius of 600 mm. In this case, the share 1 engages on the middle share section 1b, whereas in each of the share sections 1a, 1c, there is a gap 15. In this situation too, it is again the case that full-surface engagement of the share 1 on the tine is achieved in some areas, in this case in the area of the middle share section 1b, which is completely sufficient for applications.

The concept of the different bending radii R1, R2 of a share 1 thus allows the share 1 to be mounted on soil cultivation implements 2 which are bent differently. The invention takes advantage of the knowledge that it is sufficient for the intended applications to have a full-surface engagement of the share 1 on a soil cultivation implement 2 only in individual areas. This in turn allows different bending radii R1, R2 to be provided in different share sections. Even though the number of bending radii R1, R2 is not limited in this respect, it is recommended to limit the number of bending radii and, when limiting, to choose them such that they correspond to the usual radii of base bodies, such as tines. In such a design, the share 1 can then be used as a universal share and can be used or combined with various models of soil cultivation implements 2.

Figure 9:
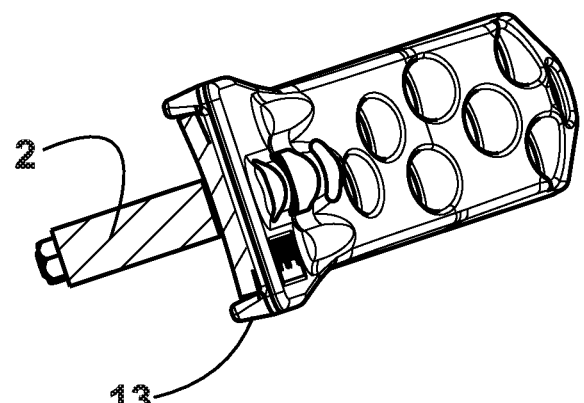
FIG. 9 shows a perspective illustration of a share fastened on a soil cultivation implement.

FIG. 9 is a perspective illustration shown in a partial section, wherein in particular the interaction of the lugs 13 with the soil cultivation implement 2 is emphasized once again. As can be seen, the lugs 13 on a lower side 10 of the share 1 are formed such that they interact with a soil cultivation implement 2 in a positive-fitting manner, thereby providing protection against twisting of the share 1 during operation.

Figure 10:
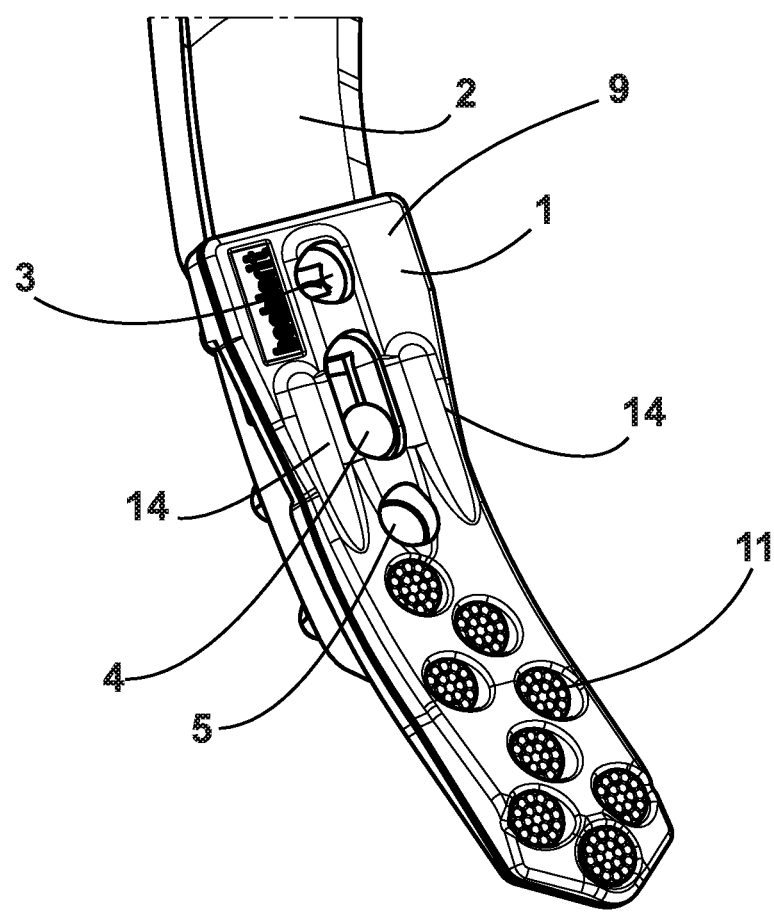
FIG. 10 shows a share fixed on a soil cultivation implement.

Lastly, FIG. 10 shows a further perspective illustration of a share 1 fastened to a soil cultivation implement 2. Usually, a share 1 according to the invention has a multiplicity of recesses on the upper side 10 in which carbide inserts 11 are secured, in particular by gluing or soldering. Furthermore, the upper side 9 can be provided with reinforcements 14 which reinforce the share base body such that it is even more robust for the intended applications.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A share for a soil cultivation implement for cultivating soil, wherein the share is bent and has at least one mounting hole for receiving a fastener, and wherein the share is tipped on an upper side with at least one carbide insert, wherein a bend of the share has a plurality of different bending radii thereby configured to provide supporting engagement of the share on base bodies of differing shapes, any of said base bodies having a radius or radii of 300 mm and/or 600 mm.

2. Share according to claim 1, wherein a first bending radius and a second bending radius are provided.

3. The share according to claim 2, wherein a plurality of share sections are bent with the first bending radius or the second bending radius.

4. The share according to claim 2, wherein a share section with the second bending radius is arranged between two share sections with the first bending radius.

5. The share according to claim 1, wherein a recess for receiving a guide plate is provided on a lower side.

6. The share according to claim 1, wherein lugs projecting from a lower side are provided.

7. The share according to claim 1, wherein a plurality of mounting holes passing through the share are provided.

8. The share according to claim 1, wherein reinforcements are provided on an upper side.

9. The share according to claim 1, wherein said supporting engagement comprises full-surface engagement of the share on the different base bodies.

10. The share according to claim 1, wherein said supporting engagement comprises partial full-surface engagement of the share on the different base bodies.

11. The share according to claim 10, wherein said partial full-surface engagement of the share on the different base bodies is configured to be sufficient engagement for a functional purpose.

12. The share according to claim 1, wherein, as a result of the bend of the share having a plurality of different bending radii, the share is configured to be bent differently from any of said base bodies, with a gap being created between the share and any of said base bodies when the share is fastened to any of said base bodies.

* * * * *